Fig. 3.

INVENTORS
Raymond R. Halik,
Paul R. Walton
BY
ATTORNEY

Fig. 4.

United States Patent Office 3,211,641
Patented Oct. 12, 1965

3,211,641
GAS-LIQUID REACTIONS AND APPARATUS THEREFOR, FOR THE HYDROGENATION AND HYDROCRACKING OF HYDROCARBONS
Raymond R. Halik, Pitman, and Paul R. Walton, Glassboro, N.J., assignors to Socony Mobil Oil Company, Inc., a corporation of New York
Filed Apr. 11, 1962, Ser. No. 186,742
17 Claims. (Cl. 208—59)

The present invention relates to gas-liquid reactions in which two phases, a gas phase and a liquid phase, exist at the reaction conditions, and, more particularly, to diffusion controlled gas-liquid reactions in which the reaction is in the liquid phase or in a liquid film on a catalyst surface and to those gas-liquid reactions having a high heat of reaction, presently requiring external heat exchange systems or high liquid recycle for temperature control with conventional reactors.

Illustrative of gas-liquid reactions in which two phases, a gas phase and a liquid phase, exist at the reaction conditions are hydrogenation of petroleum oils or fractions thereof and hydrocracking of crude, topped crudes, and fractions of petroleum oil boiling above the end boiling point of naphtha.

It is an object of the present invention to provide a method of effecting gas-liquid reactions wherein reactant gas is first dissolved in reactant liquid up to, or approaching, the limit of solubility of reactant gas in reactant liquid. It is another object of the present invention to provide a method of effecting gas-liquid reactions wherein the total amount of available reactant gas is increased by recycling a portion of the liquid effluent. It is a further object of the present invention to provide a method of effecting gas-liquid reactions wherein a miscible acceptor-donor of the reactant gas is admixed with the reactant liquid, separated from the reaction effluent, and recycled to the reaction zone or zones. The present invention also provides means whereby the aforestated objects can be accomplished. These and other objects of the present invention will become apparent from the following description taken in conjunction with the drawings in which:

Figure 1:
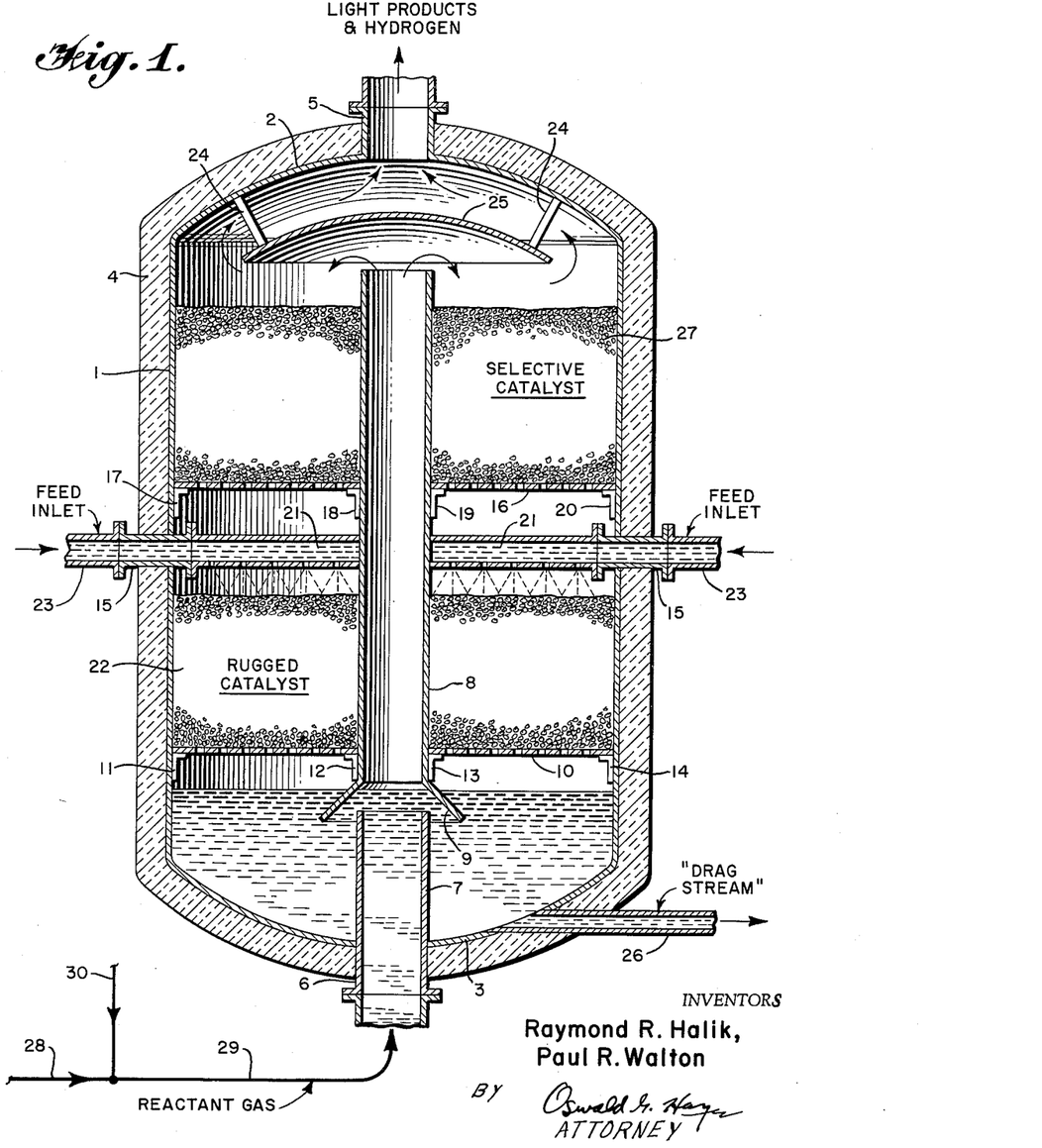
FIGURE 1 is a vertical cross-section of a reactor having means for dissolving reactant gas in liquid reactant up to, or approaching, the limit of solubility of reactant gas in reactant liquid and having means for introducing virgin liquid reactant into said reactor between two static beds of catalytic or reaction-inert, particle-form solid contact material.
Figure 2:
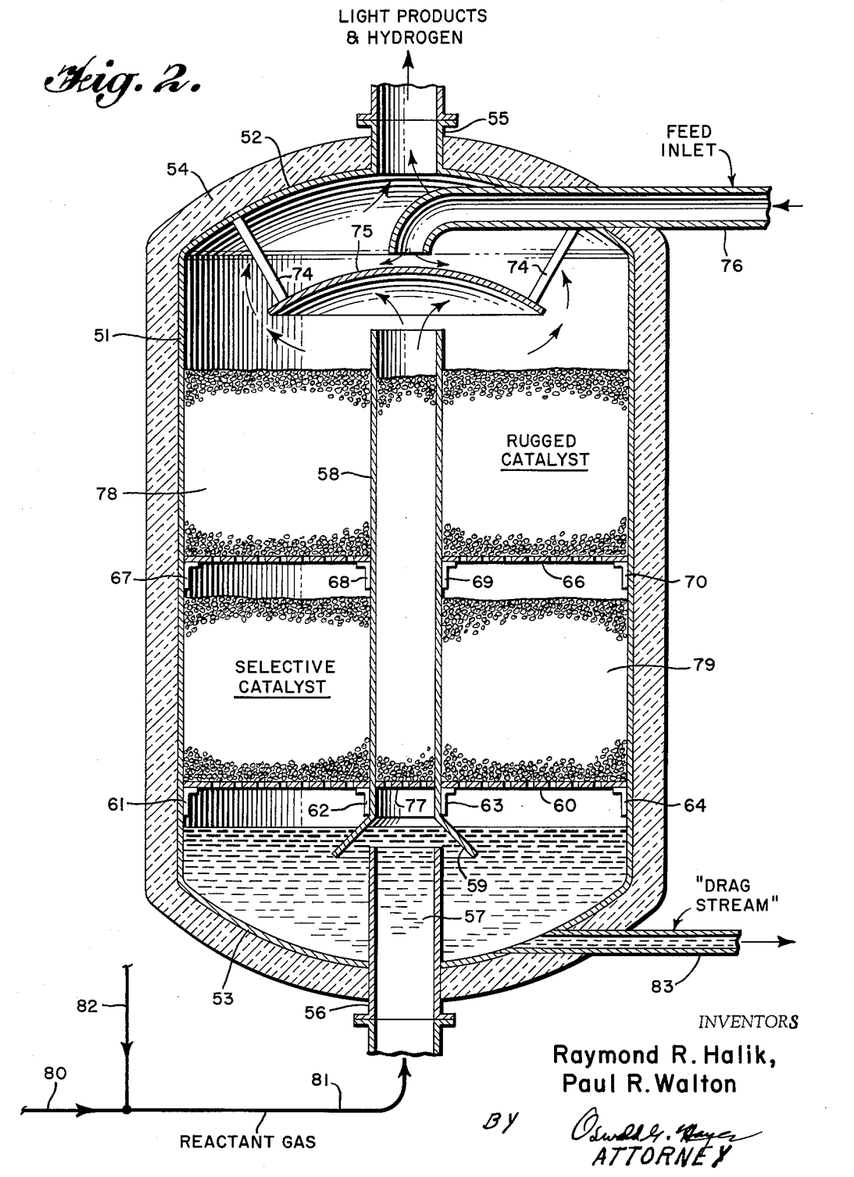
FIGURE 2 is a vertical cross-section of a reactor having means for dissolving reactant gas in liquid reactant up to, or approaching, the limit of solubility of reactant gas in reactant liquid and having means for introducing virgin liquid reactant to the top of the upper of two static beds of catalytic, or reaction-inert, particle-form solid contact material.
Figure 3:
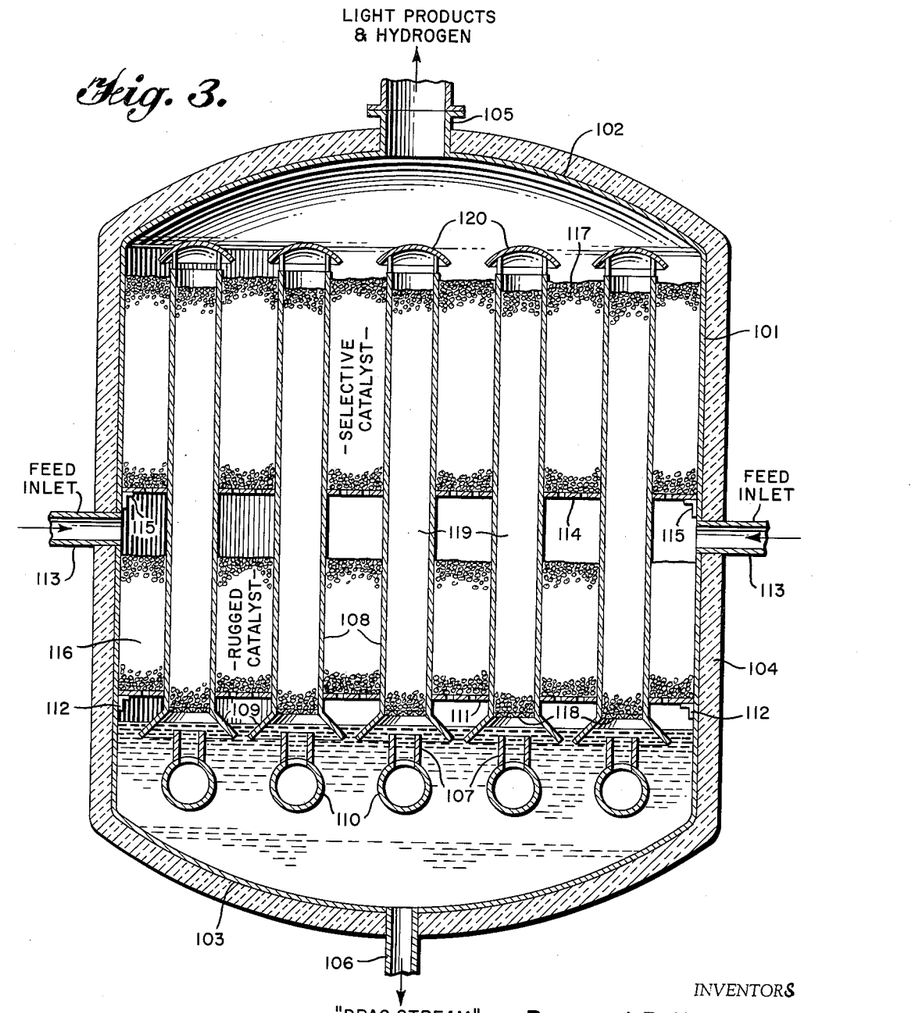
FIGURE 3 is a vertical section of a reactor having a plurality of means for dissolving reactant gas in liquid reactant up to, or approaching, the solubility of reactant gas in liquid reactant, having means for introducing virgin liquid reactant into said reactor at a point intermediate to an upper static bed and to a lower static bed each comprising catalytic, or reaction-inert, particle form solid contact material; and having means for reacting reactant gas with reactant-gas acceptor in the presence of particle-form catalytic material catalyzing the acceptance of reactant gas by said reactant-gas acceptor.

In general, the reactant gas is first contacted with the liquid reactant in the central conduit in FIGURES 1 and 2 and in the plurality of conducits in FIGURE 3. When a reactant-gas acceptor-donor is employed, the reactant-gas acceptor-donor is likewise contacted with the reactant-gas in the central conduit in the presence of a suitable catalyst as in FIGURE 2 or in the plurality of conduits as in FIGURE 3. In the reactant-gas saturating stage in the central conduit or plurality of conduits the reactant gas or gases is or are dissolved physically in the liquid reactant up to, or approaching the limit of the solubility of the reactant gas or gases in the reactant liquid. In the presence of a suitable catalyst in the presence or absence of reactant-gas acceptor-donor some reaction between the reactant-gas and reactant liquid occurs but the primary object is to dissolve as much reactant gas in the reactant liquid as the existing conditions of pressure temperature, and residence time in the saturation stage permit. The reactant liquid containing dissolved reactant gas and preferably substantially saturated with reactant gas at the pressure and temperature existing flows from the saturation stage down through the static bed or beds of catalytic or reaction-inert patricle-form solid contact material in the annular space between the central conduit and the inner periphery of the wall of the reactor (FIGURES 1 and 2) or down through the static beds or beds surrounding the plurality of conduits of the reactant-gas saturating stage (FIGURE 3). During the passage downward in contact with the particles of catalytic or reaction-inert particle-form solid contact material the dissolved reactant-gas reacts with the liquid reactant depleting the supply of dissolved reactant gas in the liquid reactant. When the total consumption of reactant gas per unit of liquid reactant is greater than the solubility of the reactant gas in the liquid reactant, liquid reactant recycle is maintained in a volume such that the consumption of reactant gas per unit volume of total liquid reactant flowing through the static bed or beds of particle-form solid contact material is less than the volume of reactant gas dissolved in the virgin liquid reactant and the liquid reactant recycle.

The volume of dissolved reactant gas available can also be increased by circulating a liquid in which the reactant gas is soluble to a greater amount under the existing conditions which liquid also is relatively inert in the principle reaction. A liquid with no greater capability of dissolving reactant gas than the liquid reactant can also be used to increase the volume of available reactant gas by increasing the volume of absorbant liquid. This liquid likewise is relatively inert in the principle reaction. A transfer agent or reactant gas acceptor-donor which is relatively inert in the principle reaction can be circulated. The transfer agent picks up the reactant gas chemically rather than physically in the saturation stage and releases the chemically absorbed reactant gas to the reactant liquid in the reaction zone or zones.

Illustrative of the problems solved by the present invention and the difficulties which are overcome by the present invention are those which arise in the hydrogenation of petroleum oils or fractions thereof and those which arise in the hydrocracking of petroleum crudes, topped petroleum crudes, deasphalted petroleum crudes and fractions of petroleum oil boiling above the boiling range of naphtha, for example, the hydrogenation of distillate fuel oils, the hydrocracking of catalytic or straight run gas oils.

In the aforementioned reactions taking place in the presence of, and involving the consumption of hydrogen, the hydrogen consumed can range from a few to more than 3000 standard cubic feet per barrel (s.c.f./b.) of oil or hydrocarbon mixture feed. A specific illustrative example is that of hydrocracking a high boiling distillate, for example one with an I.B.P. (initial boiling point) of about 700° F. wherein about 570 to about 1000 s.c.f. of hydrogen per barrel of fresh feed are consumed. Since the solubility of hydrogen in the high boiling distillate is about 85 s.c.f. of hydrogen per barrel of circulating liquid the required hydrogen can be provided by circulating at least ten volumes of liquid absorbent per volume of fresh feed, i.e., at least 10 barrels of recycled liquid reactant per barrel of fresh liquid reactant in accordance with the principles of the present invention.

Alternatively, a reactant-gas acceptor-donor can be employed. In the foregoing illustrative example, hydrogen is the reactant gas. A transfer agent capable of chemically binding hydrogen under the conditions existing in the saturation stage and chemically releasing the hydrogen in the reaction stage can be used. Thus, a polycyclic aromatic can be used as the hydrogen acceptor-donor. The mechanism involved and illustrative of the mechanism used in the embodiment of the present invention wherein a reactant-gas acceptor-donor is employed is represented by the following equations.

(1) Saturation stage:

(2) Reaction stage:

In other words, the reactant-gas acceptor-donor is any material stable under the conditions existing in the saturation stage and in the reaction stage which under the conditions existing in the saturation stage chemically binds the reactant gas (usually in the presence of a suitable catalyst) and under the conditions in the reaction stage releases the chemically bound hydrogen (usually in the presence of a catalyst). In other words, the transfer agent in the "acceptor" form accepts the reactant gas and chemically binds the reactant gas under the conditions existing in the saturation stage and is chemically transformed to the "donor" form. In the reaction stage the donor form releases the chemically bonded reactant gas and is converted to the acceptor form. Thus, in the illustration, naphthalene is the "acceptor" form of the reactant-gas transfer agent and tetralin and decalin are the "donor" forms of the reactant-gas transfer agent. The use of reactant-gas transfer agent is advantageous since the volume of reactant-gas transfer agent circulated through the saturation stage and the reaction stage usually is in the ratio of about 0.2 to about 1 mol of reactant-gas transfer agent per mol of fresh feed. Thus, to supply 570 s.c.f./b. as required in the hereinbefore mentioned illustrative example 400 pounds of naphthalene equivalent to one barrel of naphthelene (42 gallons) chemically binds 2380 s.c.f. of hydrogen to form tetralin. From which it follows that circulation of 96 pounds of naphthalene per barrel of oil to be hydrogenated provides the hydrogen required. One advantage of the use of the reactant-gas transfer agent is that it reduces the amount of liquid recycle required and then the reactor can be of greatly reduced diameter without the pressure drops exceeding the net hydrostatic head.

Usually it is found desirable to employ a reactant-gas transfer agent having an initial boiling point or a boiling point when the transfer agent is relatively a single chemical at least 25° F. higher than the end boiling point of the mixture being treated or 25° F. higher than the boiling point of a material which can be treated as a single chemical.

A reactor providing for a single central conduit saturation zone providing for two spaced-apart static beds of particle-form contact material, and providing for introduction of the feed to the top of the lower of the two beds of particle-form contact material is illustrated in FIGURE 1. The reactor comprises a cylindrical shell 1 having a rigidly mounted head 2 and a rigidly mounted bottom 3. The shell, head, and bottom are provided on the outer surfaces with a layer of insulating material 4. The head is provided with a vapor outlet 5. The bottom is provided with a reactant-gas inlet 6. Rigidly mounted in any suitable liquid-reactant tight and reactant-gas tight manner on reactant-gas inlet 6 is reactant-gas nozzle 7. Concentric with reactant-gas nozzle, saturation zone conduit 8 is mounted in any suitable manner as by "spiders" at the top and bottoms thereof (not shown) rigidly mounted on the inner periphery of the cylindrical portion 1 of the reactor. Saturation zone conduit 8 is provided with a frustro-conical flange 9 which in combination with reactant-gas nozzle 7 provides a venturi for transporting liquid from a pool in the bottom of the reactor to the top of the saturation zone conduit 8. An annular perforated or foraminous plate 10 is rigidly but movably mounted in any suitable manner as on angles 11, 12, 13, and 14 upward of the joint of flange 9 and the lower end of saturation zone conduit 8. Spaced from plate 10 the reactor is provided with a plurality of liquid-reactant inlets 15. The distance between flanged liquid-reactant inlets 15 and plate 10 is dependent upon the designed space velocity for the lower bed of particle-form solid contact material. As those skilled in the art know liquid hourly space velocity is measured as the liquid volume of the reactant contacted per hour with a unit volume of particle-form solid contact material. Therefore, the space velocity can be changed either by changing the rate of flow of the reactant or by changing the volume of contact material. Therefore in a reactor designed for use at different liquid hourly space velocities in the second bed of contact material provision can be made to raise plate 10 to increase the liquid hourly space velocity without changing the rate of flow of the liquid reactant. Stated in other words, plate 10 can be movably positioned a distance to provide a bed of median volume and provision made to position plate 10 to provide beds of minimum to maximum volume.

A second perforated or foraminous annular plate 16 is rigidly but movably mounted in any suitable manner as upon angles 17, 18, 19 and 20 between liquid reactor inlet 15 and the upper end of saturation stage conduit 8. The discussion of the positioning of plate 10 applies with equal force and effect to the positioning of plate 16.

Mounted in any suitable liquid-reactant tight and reactant-gas tight manner on the inner end of each of the liquid-reactant inlets 15 is a liquid-reactant distributor 21 constructed and arranged to spread the liquid reactant substantially uniformly over the surface of the bed of particle-form solid contact material on plate 10 and designated 22.

Mounted on the exterior end of each of the liquid-reactant inlets 15 in any suitable manner is a liquid-reactant conduit 23. Preferably, liquid-reactant conduits 23 are branches of a liquid-reactant feed manifold (not shown).

Suspended from top 2 by any suitable means such as tie-rods 24 is a baffle or deflecting means 25 constructed and arranged to separate liquid reactant from vapors and gases arising from saturation-stage conduit 8. Presently it is preferred to shape baffle 25 as a section of an arc having a radius at least one and a half times the radius of the diameter of the cylindrical portion of the reactor. However, any suitable baffle can be substituted for the aforedescribed baffle 25.

The reactor is provided with a "drag stream" outlet 26 for treated but unvaporized liquid reactant through which a "drag stream" of treated but unvaporized liquid reactant is drawn. The "drag stream" outlet is located below the surface of the liquid maintained in the reactor. Treated but unvaporized liquid reactant in excess of that required to maintain a liquid level above the lower end of the lift pipe 8 can be withdrawn through "drag stream" outlet 26 or the treated but unvaporized liquid reactant can be permitted to accumulate until the volume thereof is such that the treated but unvaporized liquid reactant is forced through products outlet 5.

The herein before described reactor can be used in the method of hydrogenating hydrocarbon mixtures, e.g., thermal gas oil having an ASTM distillation as follows:

| | |
|---|---|
| I.B.P. ° F. | 400 |
| 10% ° F. | 440 |
| 50% ° F. | 520 |
| 90% ° F. | 600 |
| E.B.P. ° F. | 660 |

The aforedescribed thermal gas oil is pumped from a source not shown at a temperature dependent upon (1) the required reaction temperature, (2) the volume and heat-capacity of (a) the fresh feed, (b) gas stream, (c) liquid recycle and (3) the heat of rtaction to a manifold not shown and thence through a plurality of manifold branches 23 to the plurality of liquid-reactant inlets 15. From inlets 15 the liquid reactant, illustratively thermal gas oil, flows to distributors 21. The liquid reactant flows from distributors 21 downwardly through the lower bed 22 of particle-form solid contact material. In the illustrative example the particle-form solid contact material is a "rugged" hydrogenation catalyst such as a mixture of oxides of cobalt and molybdenum on a refractory oxide support such as alumina. "Rugged" as used herein has the connotation of being not easily poisoned by contaminants present in the liquid reactant or in the reactant gas. Liquid reactant accumulates in the bottom of the reactor, and the reactant gas is introduced into the reactor at the required pressure through conduits 28 and 29 into nozzle 7. The reactant gas, in this example hydrogen or hydrogen-containing gas, issuing from nozzle 7 lifts the liquid reactant (thermal gas oil in this illustration) upwardly through saturation stage conduit or life pipe 8 to the top thereof. During its passage upwardly through conduit 8 the gas oil is physically saturated with hydrogen.

When the mixture of reactant gas and liquid reactant reach the top of conduit 8 the liquid reactant physically saturated with the reactant gas in part flows over the rim of conduit 8 to the top of the upper bed 27 of particle-form solid contact material. The balance of the liquid reactant entrained in the reactant gas impinges on the surface of baffle 25 and drops back on the upper surface of bed 27 to commingle with the liquid reactant flowing over the rim of conduit 8. When desirable the effluent of conduit 8 can be delivered to a distributor or a plurality of distributors (not shown) constructed and arranged to separate reactant gas from liquid reactant and to distribute the liquid reactant substantially uniformly over the upper surface of bed 27. A suitable distributor is described and claimed in U.S. Patent No. 2,898,292. The description therein is hereby incorporated in the present description.

The liquid reactant physically saturated with reactant gas flows downwardly through bed 27, over distributors 21, downwardly through bed 22 and thence to the bottom of the reactor. In the bottom of the reactor the cycle is resumed. From time to time or continuously a portion of the treated but unvaporized liquid reactant can be drawn-off through "drag stream" outlet 26 or alternatively the beds 22 and 27 can be flooded.

Preferably, the particle-form solid contact material employed in the upper bed 27, as in this illustrative example, is a more selective hydrogenation catalyst than that used in the lower bed 22. For example, a highly selective hydrogenation catalyst such as platinum-group metal, illustratively platinum, on a refractory oxide support such as a mixture of silica and alumina is employed in the hydrogenation of gas oil.

Under reaction conditions, for example those encountered in hydrocracking gas oil and in the hydrodecontamination of fuels such as domestic heating oil, products vaporous at contactor temperature are produced. Such vaporous products together with reactant gas are withdrawn through vapor outlet 5.

Illustrative of the conditions under which gas oil is hydrogenated in the method of the present invention employing the reactor illustrated in FIGURE 1 are as follows:

*Table 1*

| | |
|---|---|
| Liquid reactant | Gas oil, B. R. 400° to 660° F. |
| Catalyst lower bed | 3.5% CoO, 9.8% MoO$_3$; support: Al$_2$O$_3$. |
| Catalyst upper bed | 0.5% Pt.; support: 26% Al$_2$O$_3$, 74% SiO$_2$. |
| Reaction conditions: | |
| Average reaction temperature, ° F. | 650 to 900. |
| Reactor pressure, p.s.i.g. | 750 to 2000. |
| Reactant gas/barrel liquid reactant, s.c.f. | 1000 to 5000. |
| Liquid reactant recycle, B./B. of fresh liquid reactant | 5 to 15. |
| Liquid hourly space velocity, based upon liquid volume at room temperature and pressure, fresh feed, v./hr./v. | 1 to 10. |

It is to be observed that when hydrogenating a portion of the afore-described thermal gas oil with substantial recycle the aging rate is considerably reduced. In other words, hydrogenation of gas oil as hereinbefore described with substantial recycle reduced the aging rate of the catalyst to about 33 percent of the aging rate without substantial recycle.

FIGURE 2 is a vertical cross-section of a reactor similar to that illustrated in FIGURE 1 wherein the liquid reactant is brought into the reactor at a point above the upper surface of the upper bed of particle-form solid contact material and the saturation stage conduit or lift pipe confines preferably a substantial static bed of particle-form solid contact material. Alternatively, when particles of insufficient density to maintain a static bed in the saturation stage conduit 58 are employed a layer of high density particles of the same or different reaction active or reaction inert contact material in sufficient depth to prevent substantial movement of the under-lying bed of particles is deposited upon the primary bed of particles of solid contact material in the saturation conduit. (In place of, or in addition to, the high density particles a screen can be mounted on the top of the lift pipe or saturation stage conduit 58.) A second alternative provides for a substantially static bed of particle-form solid contact material in the saturation conduit and provision of a liquid reactant distributor (not shown) constructed and arranged to separate not only vapors from liquid reactant but also to separate finely divided solid contact material from liquid reactant discharged from the saturation stage conduit. A third alternative is to employ the saturation catalyst in a "fluidized" or "ebullated" condition but limiting the velocity of the flowing fluid to prevent significant carryover of the catalyst particles from conduit 58.

The reactor illustrated in FIGURE 2 is particularly adapted to the treatment of liquids boiling above about 500° F. For example, in the hydrocracking of topped crude, or deasphalted crude, hydrocarbon mixtures having an initial boiling point (I.B.P.) of at least about 650° F. the reactor illustrated in FIGURE 2 is presently preferred.

The reactor illustrated in FIGURE 2 comprises a shell 51, a head 52, and a bottom 53. A layer of insulating material 54 is securely mounted on the outer side of the reactor. A light products outlet 55 is provided in the top of the reactor. A reactant gas inlet 56 is provided in the bottom of the reactor. Preferably reactant gas inlet 56 is concentric with the vertical axis of the reactor. Rigidly mounted in any suitable liquid-reactant and reactant-gas tight manner on reactant gas inlet 56 is reactant-gas nozzle 57. Concentric with reactant-gas nozzle 57, saturation stage conduit 58 is mounted in any suitable manner as by "spiders" at the top and bottom thereof (not shown) rigidly mounted on the inner periphery of shell 51. Saturation stage or zone conduit or lift pipe 58 is provided with a frustro-conical flange 59 which in conjunction with reactant-gas nozzle 57 provides a gas-lift for transporting liquid from a pool in the bottom of the reactor to the top of the saturation stage conduit 58. An annular perforated or foraminous plate 60 is rigidly but movably mounted in any suitable manner as on angles 61, 62, 63, and 64 upward of the joint of flange 59 and the lower end of saturation stage conduit 58. Spaced from annular plate 60 a distance to provide for the maximum depth of a static bed of particle-form solid contact material, perforated or foraminous annular plate 66 is rigidly but movably mounted in any suitable manner as on angles 67, 68, 69 and 70. As stated in the description of FIGURE 1 means (not shown) are provided for mounting annular plates 60 and 66 in the reactor to provide static beds of particle-form solid contact material having annular diameters substantially constant but of varying depths to provide liquid hourly space velocities varying from a minimum through a maximum. However, plate 66 like plate 16 (FIGURE 1) always is positioned so that the upper surface of the static bed of particle-form solid contact material is below the plane of the upper end of the saturation zone or stage conduit 58 (FIGURE 2). Spaced vertically from the upper end of saturation zone conduit is a baffle 75 supported in any suitable manner as by a plurality of tie-rods 74 securely mounted on the inner periphery of reactor head 52.

Baffle 75 is constructed and arranged to separate entrained liquid reactant from gas reactant and reaction product vapors and return the separated liquid reactant to the upper surface of the upper bed of particle-form solid contact material. As shown in FIGURE 2, baffle 75 also serves to distribute fresh liquid reactant delivered through pipe 76 to the upper central surface of baffle 75 substantially uniformly to the upper surface of the upper bed of particle-form solid contact material. Preferably in the plane of annular plate 60 a particle-form solid contact material support 77 the outer periphery of which conforms substantially to the inner periphery of saturation zone conduit 58 is rigidly mounted in any suitable manner. Support plate 77 is constructed and arranged to retain particles of the solid contact material but provide relatively free passage of liquid reactant and reactant gas therethrough.

In the hydrocracking of heavy gas oils, straight run or catalytically cracked, topped crude, and deasphalted topped crude or in general mixtures of hydrocarbons having an initial boiling point (I.B.P.) of at least 650° F., it is presently preferred to treat the hydrocarbon mixture in a reactor having the liquid reactant inlet in the head of the reactor. Suitable particle-form solid contact material for use in the upper bed 78 is a rugged (as defined hereinbefore) cracking catalyst having capabilities for hydrogenating sulfur-containing and nitrogen-containing or, in general, catalyst-poison containing organic materials without the catalyst in the upper bed 78 being irreversibly deactivated in an industrially uneconomic on-stream period. For the hydrocracking of the aforementioned feed stocks the upper catalyst bed 78 comprises particles of solid contact material such as a mixture of oxides of cobalt and molybdenum on refractory oxide such as alumina or a mixture of refractory oxides per se such as silica and alumina. The particle-form solid contact material of which the lower catalyst bed 79 is comprised is a more selective but less rugged (as previously defined) and usually more active cracking catalyst having capabilities for hydrogenating aromatic hydrocarbons to a hydrogenated form and particularly having the capability of hydrogenating polycyclic aromatics and cracking the hydrogenated polycyclic aromatics to hydrocarbons boiling in the naphtha and kerosene boiling ranges. Illustrative of suitable less rugged (as defined hereinbefore) catalysts for use in the lower bed are platinum-group metal on a support having cracking capabilities such as alumina, silica-alumina, etc., a mixture of sulfides of nickel and tungsten on a cracking catalyst such as alumina, silica-alumina, etc.

The particle-form solid contact material comprising the saturation zone or stage catalyst is catalytic material which has good capabilities for catalyzing the reaction between the transfer agent and the reactant gas. For example, in the hydrocracking of the afore-enumerated feed stocks, and in the hydrogenation of kerosene and similar petroleum fractions boiling below the heavy gas oil range, a hydrogenation catalyst such as a mixture of sulfides of nickel and tungsten or a mixture of sulfides of nickel and tungsten on a refractory oxide support such as alumina provides satisfactory results when the transfer agent is naphthalene, tetralin and the like and the gaseous reactant is hydrogen.

The present method of physically saturating a liquid reactant, and physically saturating a liquid reactant and chemically binding a gas reacatant with a transfer agent, and treating the aforesaid liquid reactant with the physically combined or physically and chemically combined gas reactant in the presence of particle-form solid contact material is effected in a reactor such as illustrated in FIGURE 2 as follows: Liquid reactant is pumped from a source (not shown) by means of a pump (not shown) through pipe 76 on to the upper surface of baffle 75 over which it flows to be substantially uniformly distributed over the upper surface of the contact material in bed 78. The liquid reactant flows downwardly through upper bed 78 and then downwardly through lower bed 79 to form a pool of liquid reactant and transfer agent in the bottom of the reactor. When the level of the aforesaid pool of liquid reactant is above the outlet of nozzle 57 sufficient to provide a feed for the gas-lift pipe 58 hydrogen or hydrogen-containing gas under sufficient pressure to function as the driving fluid for the lift pipe flows through conduits 80 and 81 to gas reactant inlet 56 and nozzle 57. The gas-reactant issuing from nozzle 57 lifts liquid reactant and transfer agent from the pool in the bottom of the reactor upwardly through saturation zone conduit or lift pipe 58 where it contacts the bed of first catalyst catalyzing the chemical combination of the gas reactant, in this illustration hydrogen, with the transfer agent, in this illustration naphthalene. Contemporaneously, the liquid reactant dissolves or physically combines with the gas reactant, hydrogen. The mixture of hydrogenated transfer agent and liquid reactant containing dissolved hydrogen together with reactant gas issues from conduit 58. A portion flows over the rim of conduit 58 on to the surface of upper catalyst bed 78. The portion of the liquid reactant and the portion of the transfer agent which does not flow over the rim of conduit 58 impinges upon baffle 75 and falls back on the upper surface of catalyst bed 78. The hydrogen and any hydrocarbons boiling below the reaction temperature flow around baffle 75 to outlet 55 to means (not shown) for separating the hydrogen from the hydrocarbons. From the aforesaid means the hydrocarbons boiling below the reaction temperature are recovered. The separated hydrogen is recycled through conduit 82 to conduit 81 for reuse as reactant gas.

The liquid reactant and transfer agent flow downwardly through catalyst bed 78 and through catalyst bed 79 to the pool in the bottom of the reactor. From time to time or continuously, as set forth in the description of FIGURE 1, a "drag stream" is withdrawn through pipe 83 from the pool in the bottom of the reactor, the transfer agent separated from the liquid reactant, and recycled to the reactor.

The following conditions are satisfactory for the hydrocracking of heavy catalytic gas oil:

Table II

| | |
|---|---|
| Feed stock | Catalytic gas oil, B.R. 650° to 900° F. |
| Catalyst saturation zone | Nickel, 10%; Tungsten, 60%; Sulfur, 30%. |
| Catalyst upper bed | 3.5% CoO, 9.8% MoO$_3$; support: Al$_2$O$_3$. |
| Catalyst lower bed | 0.5% Pt.; support: 26% Al$_2$O$_3$, 74% SiO$_2$. |
| Reaction conditions: | |
| Average reaction temperature | 700 to 900° F. |
| Reactor pressure, p.s.i.g. | 750 to 2000. |
| Barrel of transfer agent/ barrel of liquid reactant | 0 to 10. |
| Mol reactant gas dissolved/ mol of liquid reactant | 0.2 to 4. |
| Barrels of liquid reactant plus transfer agent recycled per barrel of fresh feed | 0.2 to 10. |
| Liquid hourly space velocity [1] of liquid reactant through upper bed, v./hr./v. | 0.5 to 6. |
| Liquid hourly space velocity through lower bed, v./hr./v. | 0.5 to 4. |

[1] Based on the volume at room temperature and pressure.

While the reactors illustrated in FIGURES 1 and 2 as illustrated have only one substantially central saturation stage or zone conduit 8 and 58 respectively, it is also within the scope of the present invention to carry out the process of the present invention in a reactor having a plurality of saturation stage or zone conduits. Such a reactor is illustrated in FIGURE 3.

The reactor illustrated in FIGURE 3 comprises a cylindrical shell 101, a head 102, a bottom 103, and preferably for reactions taking place at elevated temperatures, e.g., 500° F. and higher, an insulating layer 104. The head 102 is provided with a vapor outlet 105. The bottom is provided with a "drag-stream" outlet 106. Rigidly mounted in any suitable manner as by "spiders" (not shown) at the top and bottom are a plurality of saturation zone or stage conduits 108. Each saturation zone or stage conduit 108 is provided with a frustro-conical baffle 109. Saturation conduits and the subtended frustro-conical baffles 109 are mounted vertically spaced from the bottom 103 to provide for a pool of liquid reactant or a pool of liquid reactant and transfer agent therebetween, the surface of said pool of liquid reactant or liquid reactant and transfer agent being in a plane above the plane in which the lower ends of said baffles 109 lie. Concentric with the vertical axis of each of said baffles 109 is a reactant-gas inlet nozzle 107 rigidly mounted on a reactant-gas inlet manifold branch 110. (The reactant-gas inlet manifold is not shown.) The frustro-conical baffles 109 in combination with the reactant-gas inlet nozzles 107 act as venturis whereby the liquid in the aforesaid pool is lifted into and out of the saturation zone conduits 108.

A perforated or foraminous plate 111 having ports making contact-material tight joints with saturation zone conduits 108 is rigidly mounted as on angles 112 substantially in the plane of the joint of the conduits 108 and the subtended baffles 109. Preferably, provision is made for rigidly but movably mounting plate 111 at various heights between the bottoms of conduits 108 and the liquid-reactant inlets 113 whereby the liquid hourly space velocity can be varied at the same throughput as explained hereinbefore.

A suitable vertical distance from liquid-reactant inlets 113 a perforated or foraminous plate 114 is rigidly but movably mounted in any suitable manner as by angles 115. Plate 114 is provided with ports which make substantially contact-material tight joints with saturation zone conduits 108. Provision is also made but not shown for rigidly mounting plate 114 at various distances from the plane of angles 115 but below the rims of conduits 108 to provide for various liquid hourly space velocities at the same rate of throughput.

Each of plates 111 and 114 supports a static bed of particle-form solid contact material which either catalyzes the reaction taking place in the bed or is inert to the reaction taking place in the bed. These beds are a lower bed 116 and an upper bed 117.

Each of saturation zone conduits 108 preferably is provided with a contact material support such as plates or screens 118 which support preferably static beds 119 of particle-form catalytic material catalyzing the chemical binding or saturation of a transfer agent with the gas-reactant. Thus, in a primary reaction involving hydrogen and taking place in catalyst beds 116 and 117 the catalytic material in bed 118 has the capability of chemically combining hydrogen with a transfer agent such as described hereinbefore. A suitable catalytic material for such purpose for example is a mixture of sulfides of nickel and tungsten.

Each of saturation zone conduits 108 is provided with a deflecting baffle 120 constructed and arranged to separate liquid reactant from reactant gas and other gases and/or vapors and return the liquid reactant to the upper bed of catalytic material 117. Alternatively, a single deflecting baffle can replace the plurality of deflecting baffles shown in FIGURE 3. The deflecting baffle or baffles are supported in any suitable manner as by tie-rods dependent from head 102 for a single baffle or by "spiders" mounted on each conduit 108 when a plurality of baffles 120 is employed.

The catalyst in the lower bed 116 preferably is a rugged catalyst as defined hereinbefore. For hydrogenation, hydrocracking, and other reactions dependent upon a gas reactant such as hydrogen or hydrogen-containing gases and liquid reactant containing constituents which reversibly or irreversibly deactivate platinum-group metal hydrogenating catalysts without substantially deactivating a catalyst comprising a mixture of oxides of cobalt and molybdenum on a refractory oxide support such as alumina, the latter catalytic material, i.e., a mixture of oxides of cobalt and molybdenum on an alumina support provides satisfactory operation. A suitable less "rugged" (as hereinbefore defined) but more selective catalytic material for catalyzing the hydrocracking of topped crudes, deasphalted topped crudes, straight run or catalytically produced gas oils, and the like is catalyst comprising a platinum-group metal supported on a mixture of oxides of aluminum and silicon such as a catalyst comprising 0.1 to 1.0 percent of platinum on a support comprising 60 to 90 percent silica, and 10 to 40 percent alumina.

In a reactor having only one centrally located saturation zone conduit, and wherein no special liquid distributor is provided for the spill over liquid entering the top of the catalyst bed 118, the horizontal distance between the outer periphery of the saturation zone conduit and the inner periphery of the reactor for satisfactory substantially uniform distribution of the liquid reactant over the surface of the bed of catalytic material is not more than about 3 to about 4 feet. In a reactor having a plurality of saturation zone conduits the conduits are spaced horizontally preferably about in the center of equal areas.

Thus, for a reactor to be used in treating with hydrogen about 10,000 barrels per day of deasphalted topped crude with a recycle of 0.5 to 10 volumes of liquid reactant or liquid transfer agent per volume of fresh liquid reactant it is preferred to provide saturation zone conduits spaced with 1 to 6 feet between contiguous conduits on a hexagonal pattern.

While distributors can be provided to distribute the fresh feed and/or the fresh feed-recycle mixture to each bed of catalyst it is presently preferred to eliminate the additional internals from the reactor. Accordingly, fresh feed flows through liquid reactant inlet 113 on to the surface of lower catalyst bed 116 until the level of the fresh feed in the reactor is above the level of support plate 111. The introduction of fresh feed is continued and hydrogen or hydrogen-containing gas at least at reaction temperature is introduced into reactant gas inlet manifold branches 110 under pressure sufficient to raise liquid reactant from the pool in the bottom of the reactor. The hydrogen or hydrogen-containing gas flowing through nozzles 107 combined with the frustro-conical baffles 109 raises liquid reactant through the catalyst bed 119 to the top of saturation zone conduits 108. The deflecting baffles 120 separate the liquid reactant from the reactant gas and hydrocarbons boiling below the reaction temperature at the existing pressure. The liquid reactant flows downwardly through the catalyst bed 117 to and through catalyst bed 116 to the pool in the bottom of the reactor. From time to time or preferably continuously a "drag stream" of treated liquid reactant is drawn off through "drag stream" outlet 106. The reactant gas and hydrocarbons volatile at the existing temperature and pressure flow through light products outlet 105 to gas reactant separation means. From the gas reactant separation means the gas reactant flows back to the reactant gas inlet manifold branches 110. The separated hydrocarbons volatile at reactor pressure and temperature are recovered, further processed, introduced into the refinery fuel main, or handled in any other suitable manner.

Figure 4:
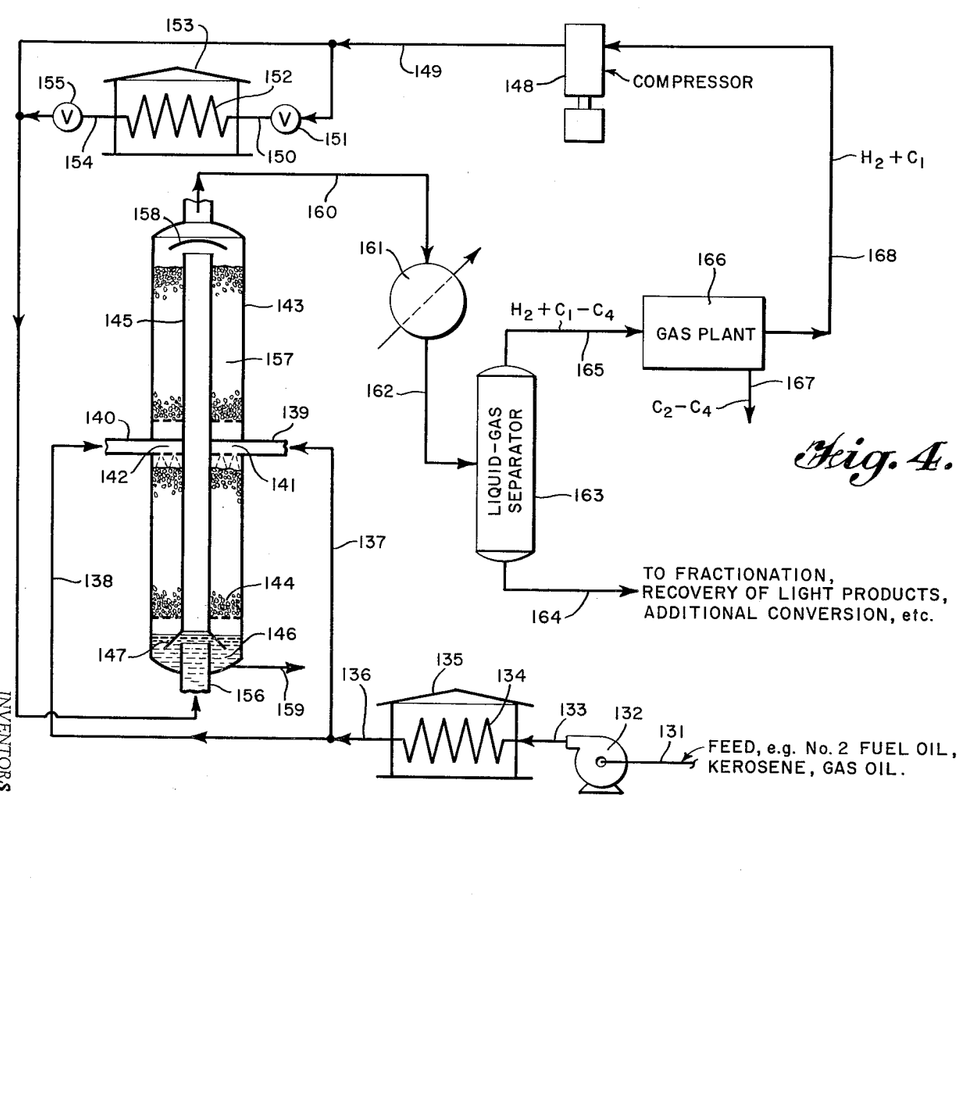
FIGURE 4 is a flowsheet showing the flow of reactant gas, virgin reactant liquid, and reactant-liquid recycle.

FIGURE 4 is a highly schematic flow sheet showing the paths of the liquid reactant, of the reactant gas and of the reaction products volatile at existing reactor temperature and pressure.

A feed stock such as distillate fuel oil, kerosene, gas oil and the like is drawn from a source not shown through pipe 131 by pump 132 and discharged into pipe 133 at a pressure in excess of reactor pressure. The feed stock flows through pipe 133 to coil 134 in feed-stock heater or furnace 135. In feed-stock heater 135 the feed stock is heated to at least reaction temperature. From heater 135 the feed stock flows through pipe 136 to pipes 137 and 138 and thence through reactor liquid reactant inlets 139 and 140 respectively to distributors 141 and 142 respectively in reactor 143. The feed stock flows downwardly through annular particle-form solid contact material bed 144 formed between saturation zone conduit 145 and the inner periphery of reactor 143.

For the hydrogen treating or hydrorefining of kerosene, distillate fuel oil, jet fuels or in general mixtures of hydrocarbons boiling above about 400° to about 450° F., at least a portion of which is non-volatile or remains liquid at the reactor conditions of pressure and temperature, the lower bed 144 comprises a "rugged" catalyst such as a mixture of oxides of cobalt and molybdenum on a refractory oxide support such as alumina. These hydrogenation catalysts having desulfurization and denitrogenation capabilities are well known as are the molybdenum sulfide, nickel-tungsten sulfide catalysts having the same capabilities to a greater or lesser degree.

When the liquid reactant pool 146 in the bottom of reactor reaches a level above the open end of the saturation zone conduit baffle 147, hydrogen or hydrogen-containing gas flowing from compressor 148 through conduit 149 and at least in part, through conduit 150 under control of valve 151 to coil 152 in reactant gas heater 153 and thence through conduit 154 under control of valve 155 to conduit 149 flows to reactant gas inlet nozzle 156.

The portion of the reactant gas, hydrogen or hydrogen-containing gas in this illustration flowing to heater 153 and the temperature to which the reactant gas is heated is regulated to supply in conjunction with the volume of recycled liquid reactant and the temperature thereof the heat required for the reaction taking place in the catalyst beds 144 and 157. The balance if any, of the reactant gas flows through conduit 149 to nozzle 156 in admixture with the heated reactant gas. The reactant gas enters nozzle 156 at a pressure sufficient to raise the desired volume of liquid reactant from the pool 146 upwardly through the saturation zone conduit 145 to the upper end thereof with sufficient velocity that the liquid reactant at least flows over the rim of conduit 145 on to the upper surface of the upper catalyst bed 157. During the passage upwardly through saturation zone conduit 145 the liquid reactant is physically saturated with the reactant gas hydrogen in this illustration.

The liquid reactant at least in part together with reactant gas strikes deflecting baffle 158. The liquid reactant drains off the lower periphery of the baffle on to the surface of the upper catalyst bed 157. The liquid reactant flows downwardly through upper annular catalyst bed 157 and lower catalyst bed 144 to the pool 146. From time to time or continuously a "drag stream" of treated liquid reactant is withdrawn through "drag stream" outlet 159.

Retractant gas and hydrocarbons volatile at the existing temperature and pressure flow from reactor 143 through conduit 160 to cooler 161. In cooler 161 the mixture is cooled to a temperature at which $C_5$ and heavier hydrocarbons are condensed. The cooled mixture flows from cooler 161 through conduit 162 to liquid-gas separator 163. In separator 163 the reactor vapor effluent comprising reactant gas and reaction products volatile under the pressure and at the temperature existing in reactor 143 is separated into reactor gas comprising reactant gas, hydrogen in the present example, and hydrocarbons having four or less carbon atoms, i.e., $C_1$ to $C_4$ hydrocarbons and reactor condensate comprising $C_5$ and heavier hydrocarbons. The reactor condensate flows through pipe 164 to means for recovering light hydrocarbons, further conversion, finishing, admixture of additives and the like as the character and composition of the reactor condensate require.

The reactor gas flows through conduit 165 to gas plant 166 where $C_2$ to $C_4$ hydrocarbons present in the reactor gas are separated from the reactant gas, in this illustrative example, comprising hydrogen and $C_1$ hydrocarbon. From the gas plant the separated $C_2$ to $C_4$ hydrocarbons flow through conduit 167 to recovery, conversion, or other use. The recycle gas comprising hydrogen and $C_1$ hydrocarbon separated from the $C_2$ to $C_4$ hydrocarbons of the reactor gas flows through conduit 168 to the suction side of compressor 148 for recirculation to reactant gas nozzle 156.

Figure 5:
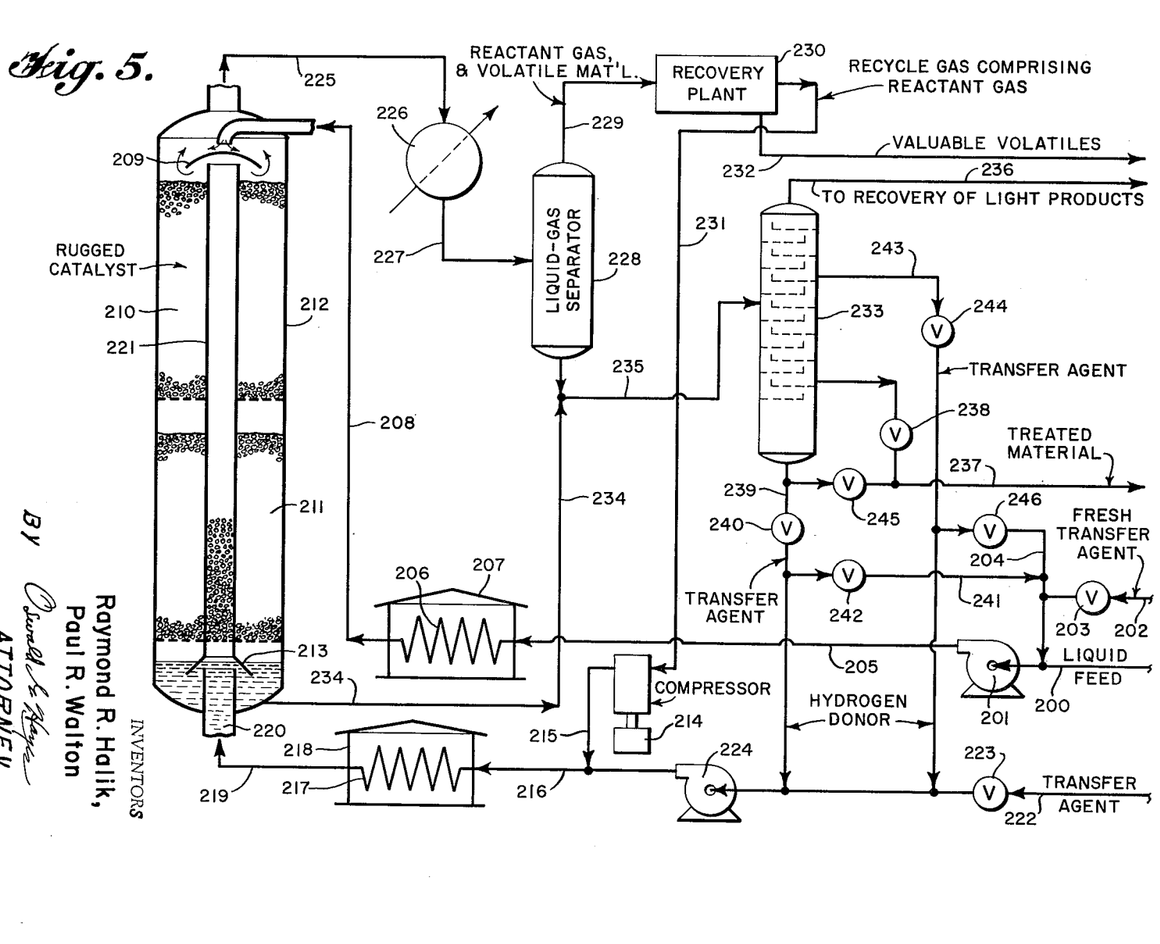
FIGURE 5 is a flowsheet showing the flow of reactant gas, virgin liquid reactant, reactant-gas acceptor, and liquid reactant recycle.

FIGURE 5 is a highly schematic flow-sheet showing the flow of liquids and vapors in the embodiment of the present invention wherein a transfer agent is used. Thus, a mixture of hydrocarbons boiling above about 400° to about 450° F. at least a portion of which is not volatile at reactor conditions of pressure and temperature is drawn from a source not shown through pipe 200 by pump 201. A liquid transfer agent having an initial boiling point such that the said transfer agent is non-volatile at reactor conditions of temperature and pressure in volume sufficient to provide chemically bound gas reactant required for the primary reaction in excess of that physically carried by recycled liquid reactant is drawn from a source not shown through pipe 202 under control of valve 203 and through pipe 204 by pump 201. (When the volume of liquid reactant and transfer agent in the pool in the bottom of the reactor is sufficient to supply the required volume of transfer agent valve 203 is closed and transfer agent recycled as hereinafter described.) The mixture of liquid reactant and transfer agent or liquid reactant only after sufficient transfer agent has accumulated in the pool in the bottom of the reactor is discharged by pump 201 into pipe 205 at a pressure in excess of that in reactor 212. The liquid reactant and transfer agent or liquid reactant only flows through pipe 205 to coil 206 in heater 207. In heater or furnace 207 the mixture of liquid reactant and transfer agent or liquid reactant is heated at least to reaction temperature. From heater 207 the mixture of liquid reactant and transfer agent or liquid reactant only flows through pipe 208 to distributor-deflector 209. The liquid flows over distributor deflector 209 to be substantially uniformly distributed over the surface of the particle-form solid contact material comprising upper annular static bed 210. The particle-form solid contact material of annular static bed 210 comprises preferably material catalyzing the reaction between the liquid reactant and the reactant gas while catalyzing the evolution of reactant gas from the transfer agent. As emphasized hereinbefore the catalyst in upper annular bed 210 is preferably a "rugged" catalyst as defined hereinbefore.

Distributor-deflector 209 can be replaced by a distributor of any suitable type and a separate deflecting baffle. The liquid reactant or liquid reactant-transfer agent flows downwardly through upper annular contact material bed 210 to and through lower annular contact material bed 211. The liquid reactant and transfer agent collect in a pool in the bottom of reactor 212. When the upper surface of the aforesaid pool of liquid reactant and transfer agent is above the plane of the open ends of frustro-conical baffles 213 reactant gas or gas containing reactant gas flowing at a pressure in excess of reactor pressure from compressor 214 through conduit 215 and 216 to coil 217 in heater 218 and thence through conduit 219 to reactant gas nozzle 220 is admitted to saturation zone conduit 221. During passage through heater 218 the reactant gas is heated at least to reaction temperature.

As an alternative to mixing the liquid transfer agent with the liquid reactant the liquid transfer agent is drawn from a source not shown through pipe 222 under control of valve 223 by pump 224. Pump 224 discharges the transfer agent into conduit 216 through which the transfer agent flows to coil 217 in heater 218 and thence through conduit 219 to nozzle 220 in reactor 212. Reactant gas for example recycle gas flowing from recovery plant 230 to the suction side of compressor 214 and discharged into conduit 215 by compressor 214 at a pressure at least equal to that in conduit 216 flows to conduit 216 to mix with the transfer agent. When the depth of the pool of liquid reactant and liquid transfer agent in the bottom of reactor 212 is such that the upper surface of the pool is above the open end of baffle 213, reactant gas is admitted to conduit 216 as previously described.

The reactant gas and transfer agent rise through saturation zone conduit 221 drawing liquid from the pool in the bottom of the reactor by reason of the "venturi-like" action of nozzle 220 and baffle 213. Preferably, saturation zone conduit 221 confines a particle-form solid contact material having the capability of chemically combining reactant gas with the transfer agent.

During the passage upwardly through the catalyst confined in saturation zone conduit 221 reactant gas is dissolved in the liquid reactant and chemically combined with the transfer agent. At the upper end of conduit 221 liquid reactant and transfer agent are separated from reactant gas and other materials volatile at reactor pressure and temperature. The volatile materials and reactant gas flow from reactor 212 through conduit 225 to cooler 226. In cooler 226 the mixture is cooled to a temperature at which $C_4$ and heavier hydrocarbons are liquid. From cooler 226 the mixture flows through conduit 227 to liquid-gas separator 228. In separator 228 reactant gas and materials volatile at separator temperature and pressure flow therefrom through conduit 229 to recovery plant 230. In recovery plant 230 reactant gas is separated from valuable or contaminating materials volatile at separator pressure and temperature. The recycle gas comprising reactant gas flows from recovery plant 230 through conduit 231 to the suction side of compressor 214 for recirculation to nozzle 220 (as described hereinbefore). The valuable materials volatile at separator pressure and temperature or the contaminants so characterized and separated in recovery plant 230 flow therefrom through conduit 232 to recovery, disposal, or other means dependent upon the character thereof.

Returning to separator 228, the portion of the mixture of reactant gas and materials, e.g., reaction products, volatile at reactor pressure and temperature, liquid at separator temperature and pressure, flows from separator 228 through pipe 235 to fractionator 233. Intermediate to separator 228 and fractionator 233 a mixture of transfer agent and treated liquid reactant flowing from reactor 212 through pipe 234 is admixed with the liquid flowing in pipe 235.

In fractionator 233 the mixture of liquid from separator 228, treated liquid reactant, and transfer agent is fractionated into an overhead comprising material volatile at reactor pressure and temperature but liquid at separator pressure and temperature, a side stream comprising treated liquid reactant, and a bottoms comprising transfer agent. The overhead is taken from fractionator 233 through pipe 236 to recovery, additional conversion, storage, admixture of additives and the like. The sidestream is taken through pipe 237 under control of valve 238 to recovery, additional conversion, storage, blending, admixture of additives, and the like. The bottoms, i.e., transfer agent flows from fractionator 233 through pipe 239 under control of valve 240 to pipe 222 for recycle by pump 224. Alternatively the transfer agent flows from pipe 239 through pipe 241 under control of valve 242 to pipe 204 and thence to pipe 200 to admixture with fresh liquid reactant.

When the transfer agent is liquid at reactor temperature and pressure but more volatile than treated liquid reactant at fractionator pressure, an overhead flows as previously described through pipe 236. The transfer agent is taken as a side-stream flowing through pipe 243 under control of valve 244 to pipe 222. The treated liquid reactant is a bottoms and flows from fractionator 233 through pipes 239 (valve 240 closed) and 237 under control of valve 245. Alternatively, the transfer agent taken as a side-stream through pipe 243 can flow through pipe 204 under control of valve 246 to pipe 200 for admixture with fresh liquid reactant.

The temperature at which the liquid reactant and/or the reactant gas is introduced into the contactor is dependent upon the type of reaction which takes place between the liquid reactant and the reactant gas. Thus, when the reaction is exothermic the temperature of the liquid reactant and generally that of the reactant gas entering the contactor is below reaction temperature. On the other hand, when the reaction is endothermic the liquid reactant and generally the reactant gas enter the contactor at a temperature higher than the reaction temperature.

We claim:

1. A method of contacting liquid reactant at least a portion of which is non-volatile at contactor temperature and pressure with reactant gas in the presence of particle-form solid contact material which comprises introducing liquid reactant at an elevated temperature and pressure into a reaction zone having confined therein at least one confined saturation zone and a plurality of at least two superposed, separated, annular primary static beds of particle-form solid contact material concentric with said confined saturation zone, passing said heated liquid reactant downwardly through at least one of said static beds of particle-form solid contact material, gathering the liquid reactant in a pool in said reaction zone below the lower most static bed of particle-form solid contact material, in a stream of reactant gas lifting a portion of liquid reactant from the aforesaid pool to the top of the upper most static bed of particle-form solid contact material as a confined stream comprising liquid reactant and reactant gas to physically dissolve an amount of reactant gas in said lifted portion of liquid reactant to maintain in said lifted portion an amount of reactant gas at least equal to the amount of reactant gas consumed per unit volume of total liquid reactant flowing through said plurality of superposed separated annular primary static beds of particle-form solid contact mass material, separating reactant gas and materials volatile at reaction zone pressure and temperature from liquid reactant physically substantially saturated with said gas reactant, flowing said liquid reactant physically substantially saturated with gas reactant downwardly through at least one static bed of particle-form solid contact material, withdrawing treated liquid reactant from the aforesaid pool, withdrawing reactant gas and materials volatile at reaction zone temperature and pressure, separating reactant gas from materials volatile at rection zone temperature and pressure, and recycling said reactant gas to said reaction zone.

2. The method of contacting liquid reactant at least a portion of which is non-volatile at contactor temperature and pressure as set forth and described in claim 1 wherein the at least one primary static bed of particle-form solid contact material comprises contact material catalyzing a reaction between the liquid reactant and the reactant gas.

3. The method of contacting liquid reactant at least a portion of which is non-volatile at contactor temperature and pressure as set forth and described in claim 1 wherein the said confined stream comprises liquid reactant, reactant gas, and transfer agent, and wherein the said confined stream contacts a secondary bed comprising particle-form solid contact material catalyzing the chemical bonding of said reactant gas and said transfer agent prior to contacting the said at least one primary static bed of particle-form solid contact material, and wherein the at least one bed of particle-form solid contact material comprises contact material catalyzing the chemical evolution of said reactant gas from said transfer agent and chemical bonding of said evolved reactant gas with said liquid reactant.

4. The method of contacting liquid reactant at least a portion of which is non-volatile at contactor temperature and pressure as set forth and describd in claim 1 wherein the said reaction zone confines two separate static primary beds of particle-form solid contact material catalyzing a reaction between the said liquid reactant and the said reactant gas.

5. The method of contacting liquid reactant at least a portion of which is non-volatile at contactor temperature and pressure as set forth and described in claim 1 wherein the said reaction zone confines two separate static beds of particle-form solid contact material catalyzing a reaction between the said liquid reactant and the said reactant gas, wherein one of said separate static primary beds of particle-form solid contact material comprises "rugged" (as defined hereinbefore) contact material catalyzing the reaction between the said liquid reactant and the said reactant gas, wherein the other of said separate static primary beds of particle-form solid contact material comprises "selective" (as defined hereinbefore) contact material catalyzing the reaction between the said liquid reactant and the said reactant gas, and wherein the liquid reactant contacts the aforesaid "rugged" contact material before contacting the aforesaid "selective" contact material.

6. The method of contacting liquid reactant at least a portion of which is non-volatile at contactor temperature and pressure as set forth in claim 1 wherein the confined stream comprises liquid reactant, reactant gas, and transfer agent, and wherein the aforesaid confined stream contacts a secondary bed comprising particle-form solid contact material catalyzing a reaction between said reactant gas and said transfer agent to produce a chemical bond therebetween from which said reactant gas is released in at least one of said static beds of particle-form solid contact material.

7. The method of contacting liquid reactant at least a portion of which is non-volatile at contactor temperature and pressure as set forth and described in claim 1 wherein the liquid reactant is a petroleum fraction having a boiling range above about 400° to about 450° F., wherein the reactant gas is hydrogen, and wherein the primary static bed of particle-form solid contact material comprises contact material catalyzing the hydrogenation of hydrocarbons.

8. The method of contacting liquid reactant at least a portion of which is non-volatile at contactor temperature and pressure as set forth and described in claim 1 wherein the liquid reactant is a petroleum fraction having a boiling range above about 400° to about 450° F., wherein the reactant gas is hydrogen, wherein the said reaction zone confines two separate static primary beds of particle-form solid contact material, wherein one of the primary static beds of particleform solid contact material comprises "rugged" (as hereinbefore defined) contact material catalyzing the hydrogenation of hydrocarbons, wherein the other primary static bed of particle-form solid contact material comprises "selective" (as defined hereinbefore) contact material catalyzing the hydrogenation of hydrocarbons, and wherein the said petroleum fraction contacts the aforesaid "rugged" contact material before contacting the aforesaid "selective" contact material.

9. The method of contacting liquid reactant at least a portion of which is non-volatile at contactor temperature and pressure as set forth and described in claim 1 wherein the liquid reactant is a petroleum fraction having a boiling range above about 400° to about 450° F., wherein the reactant gas is hydrogen, wherein the said reaction zone confines two separate static primary beds of particle-form solid contact material, wherein one of the primary static beds of particle-form solid contact material comprises "rugged" (as hereinbefore defined) contact material catalyzing the hydrogenation of hydrocarbons, wherein the other primary static bed of particle-form solid contact material comprises "selective" (as defined hereinbefore) contact material catalyzing the hydrogenation of hydrocarbons, wherein the said petroleum fraction contacts the aforesaid "rugged" contact material before contacting the aforesaid "selective" contact material, wherein the said confined stream comprises the said petroleum fraction, transfer agent, and hydrogen, and wherein the aforesaid confined stream contacts a secondary bed comprising particle-form solid contact material catalyzing the hydrogenation of said transfer agent.

10. The method of contacting liquid reactant at least a portion of which is non-volatile at contactor temperature and pressure as set forth and described in claim 1 wherein the liquid reactant is a petroleum fraction having a boiling range above about 400° to about 450° F., wherein the reactant gas is hydrogen, wherein the said reaction zone confines a first primary static bed of particle-form solid contact material comprising a mixture of oxides of cobalt and molybdenum on refractory oxide support and a second primary static bed of particle-form solid contact material comprising platinum-group metal on refractory oxide support, wherein liquid reactant contacts said first primary static bed prior to contacting said second primary static bed, wherein the said confined stream comprises the said liquid reactant, a transfer agent, and hydrogen, and wherein said confined stream is contacted with particle-form solid contact material comprising sulfides of nickel and tungsten.

11. The method of contacting liquid reactant at least a portion of which is non-volatile at contactor temperature and pressure as set forth and described in claim 10 wherein the said transfer agent is selected from the group consisting of naphthalene and incompletely hydrogenated naphthalenes such as tetralins and decalins.

12. The method of contacting liquid reactant at least a portion of which is non-volatile at contactor temperature and pressure as set forth and described in claim 1 wherein the said reaction zone confines two separate static beds of particle-form solid contact material, wherein one of said superposed, separated, annular, primary static primary beds of particle-form solid contact material comprises "rugged" (as defined hereinbefore) hydrocracking catalyst, wherein the other of said static primary beds of particle-form solid contact material comprises "selective" (as defined hereinbefore) hydrocracking catalyst, wherein the liquid reactant is a mixture of hydrocarbons having an initial boiling point of at least 650° F., wherein the reactant gas is hydrogen, and wherein said mixture of hydrocarbons contacts said "rugged" hydrocracking catalyst before contacting said "selective" hydrocracking catalyst.

13. The method of contacting liquid reactant at least a portion of which is non-volatile at contactor temperature and pressure as set forth and described in claim 1 wherein the said reaction zone confines two superposed, separated, annular, primary static beds of particle-form solid contact material, wherein one of said separated static primary beds of particle-form solid contact material comprises "rugged" (as defined hereinbefore) hydrocracking catalyst, wherein the other of said static primary beds of particle-form solid contact material comprises "selective" (as defined hereinbefore) hydrocracking catalyst, wherein the liquid reactant is a mixture of hydrocarbons having an initial boiling point of at least 650° F., wherein the reactant gas is hydrogen, and wherein said mixture of hydrocarbons contacts said "rugged" hydrocracking catalyst before contacting said "selective" hydrocracking catalyst.

14. An apparatus comprising in combination a cylindrical chamber closed at its upper and lower ends, at least one open end first conduit spaced above the bottom of the cylindrical chamber and extending upwardly through a substantial portion of said chamber, vertically spaced apart beds of particle form contact material provided in the space between the walls of the chamber and the open-end conduit extending upwardly therethrough, an open end second conduit for introducing vaporous material into said chamber and communicating with the bottom open end of said first conduit, said second conduit extending through the bottom of said chamber, a deflector plate positioned above the upper open end of said first conduit, said deflector plate being of greater diameter than said first conduit, conduit means for withdrawing vaporous material from the upper portion of said chamber, conduit means for removing liquid from the lower portion of said chamber beneath said lower most bed of contact material and conduit means for introducing liquid material into said chamber for flow downwardly through at least one of the said beds of contact material.

15. The apparatus of claim 14 wherein said beds are annular beds supported on vertically spaced apart perforated grid members to provide a plurality of separate annular beds.

16. The apparatus of claim 15 where conduit means are provided for introducing liquid feed to said chamber above said deflector baffle.

17. The apparatus of claim 15 where conduit means are provided for introducing liquid feed to an intermediate portion of said chamber and above the lower most annular bed of contact material therein.

References Cited by the Examiner

UNITED STATES PATENTS

| | | | |
|---|---|---|---|
| 2,205,409 | 6/40 | Houdry | 208—146 |
| 2,338,345 | 1/44 | Mather | 23—288 |
| 2,548,015 | 4/51 | Goodson | 208—146 |

ALPHONSO D. SULLIVAN, *Primary Examiner.*

UNITED STATES PATENT OFFICE
CERTIFICATE OF CORRECTION

Patent No. 3,211,641                                           October 12, 1965

Raymond R. Halik et al.

It is hereby certified that error appears in the above numbered patent requiring correction and that the said Letters Patent should read as corrected below.

Column 2, line 5, for "conducits" read -- conduits --; column 5, line 30, for "rtaction" read -- reaction --; column 10, line 38, for "118" read -- 119 --; column 12, line 39, for "Retractant" read -- Reactant --; column 15, line 31, for "rection zone temperture" read -- reaction zone temperature --; column 17, line 16, for "separate" read -- superposed, separated, annular, primary --; column 18, line 23, strike out "the".

Signed and sealed this 17th day of May 1966.

(SEAL)
Attest:

ERNEST W. SWIDER                                           EDWARD J. BRENNER
Attesting Officer                                               Commissioner of Patents